United States Patent [19]
Barclay et al.

[11] 4,167,309
[45] Sep. 11, 1979

[54] ELECTROCHROMIC DISPLAY DEVICE

[75] Inventors: Donald J. Barclay, Olivers Battery; Colin L. Bird, Fair Oaks; Anthony C. Lowe, North Baddesley; David H. Martin, Chandlers Ford, all of England

[73] Assignee: International Business Machines Corporation, Armonk, N.Y.

[21] Appl. No.: 877,219

[22] Filed: Feb. 13, 1978

[30] Foreign Application Priority Data

Apr. 19, 1977 [GB] United Kingdom ............... 16208/77

[51] Int. Cl.$^2$ ............................................... G02F 1/17
[52] U.S. Cl. ....................................................... 350/357
[58] Field of Search ........................................ 350/357

[56] References Cited
U.S. PATENT DOCUMENTS

| | | | |
|---|---|---|---|
| 3,712,709 | 1/1973 | Kenworthy | 350/357 |
| 4,018,508 | 4/1977 | McDermott et al. | 350/357 |

*Primary Examiner*—James W. Davie
*Attorney, Agent, or Firm*—Joseph E. Kieninger

[57] ABSTRACT

An electrochromic display device adapted to be accurately erased has an opaque counter electrode in the shape of a pattern of lines, preferably reticulate, on the underside of the face of the display device through which the display is viewed. The counter electrode is brought to a predetermined potential either by trapping a suitable material capable of a reversible redox reaction at the counter electrode or by initially charging the counter electrode with heptyl vilogen cation radical. This enables voltage erase to be used.

13 Claims, 3 Drawing Figures

ELECTROCHROMIC DISPLAY DEVICE

DESCRIPTION

Technical Field

This invention relates to an electrochromic display device, and more particularly, to such a device that can be accurately erased.

It is a primary object of this invention to provide an improved electrochromic display device.

It is another object of this invention to provide an electrochromic display device that can be accurately erased.

It is still another object of this invention to provide an electrochromic device that utilizes voltage erase.

It is still another object of this invention to precisely control the effect of voltage that is used for erasing an electrochromic display device.

It is yet still another object of this invention to provide an electrochromic device to erase without a reference electrode.

Background Art

For the purposes of this specification an electrochromic display device is a device wherein the display effect is achieved as a consequence of a redox reaction caused by the passage of charge between a display electrode and a counter electrode both in contact with a suitable electrolyte. An example of an electrochromic display device is given in British Pat. No. 1,376,799 wherein the electrolyte includes heptyl viologen dications. Upon reduction at the display electrode, a purple film which is insoluble in the electrolyte is deposited on the display electrode, i.e. the writing step. Oxidation at the display electrode returns the dications to the electrolyte, i.e., the erasing step. Thus, by providing a plurality of display electrodes and selectively energizing them, a required display can be generated. Other materials can be used. Development has taken place of displays which employ redox reactions of inorganic materials, such as tungstic oxide, to achieve the display effect. This invention is of application to any electrochromic display.

In order to provide a practical display device, it is necessary to be able accurately to erase the display. In generating the display, which operation will be called writing, a certain quantity of material is deposited on the display electrode. Erasure must remove just that amount of material or it will result in the display being over driven with consequent undesirable electrochemical reactions, such as the evolution of oxygen bubbles.

In a simple cell consisting of only a display electrode and a counter electrode, a third, reference, electrode can be used to control erasure. A coloured species is formed in the case of the heptyl viologen dication by reduction at the display electrode to the cation radical. Deposition of the species is thus equivalent to charging the electrode. The function of the reference electrode in erasure is to provide a means of controlling the potential difference between the display electrode and the electrolyte.

The reference electrode is positioned as close to the display electrode as possible without screening the display electrode, in order to minimize errors due to electrolyte resistance. It is clearly impractical to use this arrangement when there are a plurality of display electrodes. A plurality of reference and counter electrodes would add to the cost of the display device, especially when the complexity of the electrical circuitry is taken into account.

One possibility with electrochromic displays is to have a single counter electrode with a single reference electrode located along one edge of the display device with the counter electrode located at the opposite edge of the device. The drawback to this arrangement is that the electrolyte is not of negligibile resistance and so display electrodes nearer the counter electrode are preferentially erased, since current flows in the electrolyte between the display electrodes and the counter electrode. It is possible that in small display devices, for example, in single character display cells with an electrode pattern of the kind used in pocket calculators to provide a numeric display, this counter and reference electrode arrangement may operate satisfactorily. What is certain is that oppositely disposed reference and counter electrodes do not operate satisfactorily with relatively large area display devices with many display electrodes arranged in rows and columns.

Because of the electrolyte resistance a transparent low-resistance counter electrode overlying all the display electrodes must be provided, so that the effective resistance between the counter electrode and any display electrode is low. Current spreading through the electrolyte is minimized and the preferential current flow is minimized and the preferential current flow is through the counter electrode. The reference electrode now no longer senses the electrolyte potential close to the display electrode but the sum of the counter electrode potential and the potential drop between the counter electrode and the electrolyte close to the reference electrode. Both these potentials are ill-defined.

U.S. Pat. No. 3,961,842 describes an electrochromic display device using an electrolyte consisting of a solution of an n-heptyl viologen dication, a dihydrogen phosphate anion and potassium phosphate salt buffer and which operates by reduction to the cation radical as an insoluble film on the display electrodes. The counter electrode is of palladium hydride which is stated to be non-polarizable over the operating range of the cell, i.e., during a redox reaction the potential of the electrode remains substantially constant. This enables a reference electrode to be dispensed with. The Patent also mentions the problem, encountered during erasure, of the deposition of colored species on the counter electrode. The electrode arrangement described therein comprises display and counter electrodes side by side with the counter electrode masked from the Viewer. The Patent does not consider the problem discussed above which makes the side-by-side positioning of display and counter electrodes not an entirely satisfactory arrangement.

BRIEF DESCRIPTION OF DRAWINGS

In the accompanying drawings forming a material part of this disclosure.

DISCLOSURE OF INVENTION

For further comprehension of the invention, and of the objects and advantages thereof, reference will be had to the following description and accompanying drawings, and to the appended claims in which the various novel features of the invention are more particularly set forth.

Accordingly, the invention comprises an electrochromic display device including a hollow panel enclosing a suitable electrolyte and having one face transparent, a counter electrode located on the inner surface of the said one face, and a plurality of display electrodes on the opposite inner face of the panel, characterized in that the counter electrode is charged to a known potential, is of opaque conductive material, and is in the shape of a pattern of lines.

This invention overcomes the control problem by providing a counter electrode on the front or viewing side of an electrochromic display device, which counter electrode is everywhere at a known potential with respect to the electrolyte. The need for a reference electrode is avoided.

The known potential is achieved by precharging the counter electrode with a suitable material capable of a reversible redox reaction. The potential at the counter electrode is thus fixed. To avoid the viewer seeing the species on the counter electrode, it is made of opaque material, which, to avoid masking of the display electrodes, is in the shape of a pattern of thin lines, preferably reticulate.

With the counter electrode precharged, the potential difference between the counter electrode and the electrolyte is known. If the potential drop in the counter electrode is known, and this is readily found, then an edge of the counter electrode remote from its electric terminal can be used as a reference electrode. Further, and this is the preferred way of using a precharged counter electrode, if the counter electrode is of sufficiently low resistance, the electric terminal itself becomes the reference and erasure is effected simply by connecting the display electrodes to a potential of given value relative to the counter electrode. This is a self-limiting operation similar to the discharge of a battery.

An erase operation using a reference electrode is called a potentiostatic erase. The preferred method of erasure is called a voltage or tensiostatic erase.

Best Mode for Carrying Out the Invention

We first describe the physical characteristics of a display device according to the invention.

Figure 1:
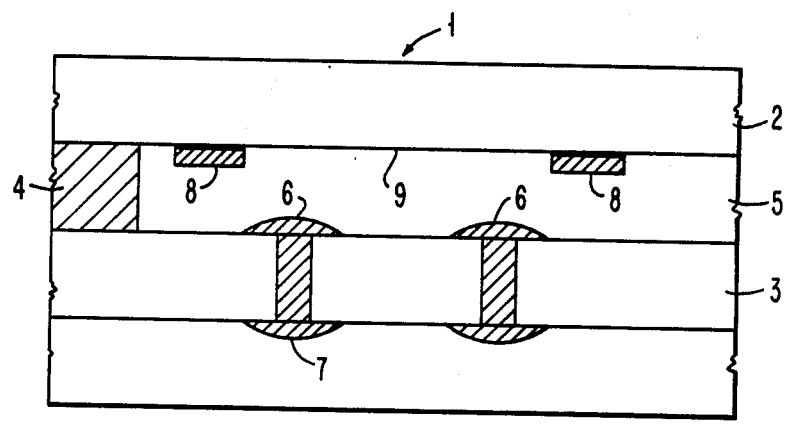
FIG. 1 is a schematic cross-section through an electrochromic display device according to the invention.

Referring to FIG. 1, which shows a schematic cross-section of a display device according to the invention, a panel 1 consists of parallel sheets 2, 3 of glass or other suitable material sealed together at the periphery by sealing glass 4 or some other bonding material to enclose a hermetic space 5. Techniques for making such a panel are well-established and will not further be described. At least sheet 2 of the panel is transparent since the device is intended to be viewed from that side. FIG. 1 is not to scale, the sheets 2, 3 are about 6 mm thick, and are spaced apart by 2 mm. Display electrodes 6 are provided on the face of sheet 3 bounding the space 5. The electrodes 6 are connected through sheet 3 to terminals 7 on the outer face of the sheet. The terminals 7 can be connected directly to electronic switches, or, when the spacing of the display electrodes permit, conductors can lead from the terminals 7 to the edge of the panel for connection to drive circuitry. Details of the drive circuitry and how it is connected to the display electrodes 6 form no part of the invention.

Figure 2:
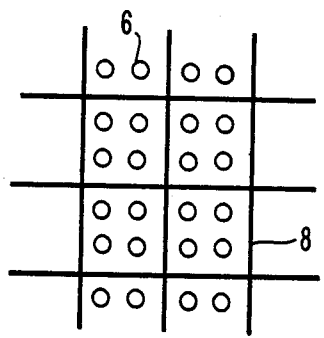
FIGS. 2 and 3 are illustrative of different counter electrode patterns.

Our invention includes the provision of an opaque counter electrode 8 shaped as thin lines and located on the inner face 9 of transparent sheet 2. Although not shown in FIG. 1, it is to be understood that the lines comprising the counter electrode are connected to form a single conductor. The counter electrode is deposited on the transparent substrate 2 and may be arranged in any suitable pattern. It is most preferred that the lines form a reticulate pattern, such as the rectangular grid shown in FIG. 2. Each square of the grid may bound a single display electrode 6, but satisfactory results are achieved when a plurality of display electrodes are enclosed, for example, a $2 \times 2$ matrix, as shown, or even as many as form a $5 \times 5$ matrix. The grid can be composed of rectangles or regular polygons, rather than squares, and, if the display device is intended to display only characters, a rectangle of the grid can be arranged to bound a single character position.

Figure 3:
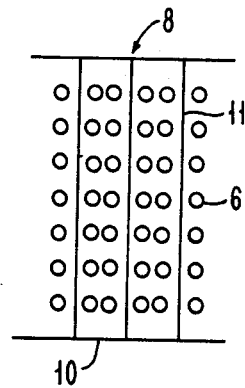

Another possible shape is a grid-iron as shown in FIG. 3. A lateral edge 10 can be dispensed with. While two columns of display electrodes are shown between the lines 11, more or less than two columns can be arranged therebetween. The pattern of the counter electrode need not consist of straight lines. For example, the line 11 in FIG. 3 can be zig-zag or curved. Much depends on the visual effect produced by the particular choice of electrochromic material, and on the nature of the display—alphanumeric, graphic or image.

The counter electrode 8 may be deposited on the transparent plate 2 by evaporation. This may give rise to a highly reflective visible viaible through the plate 2. Accordingly, it is preferred that the inner surface of the plate 2 is modified such that the metal interface becomes a good diffuse reflector. Electrical connection to the counter electrode is effected by means of a conventional edge connection arrangement.

We now consider the structure of the counter electrode 8, as distinct from its shape. It will be understood that any of the shapes described can be combined with any of the structures.

One way of charging the counter electrode 8 is to trap material in close proximity to a conductor so that the counter electrode consists of a pattern of conductors as described above coated with a charged material. In a first structural embodiment, the conductors are of platinum coated with porous anodized aluminum ($Al_2O_3$). In the pores is trapped a suitable redox couple such as $Fe^{II}/Fe^{III}$. This is done by steeping the anodized coating in a solution of $Fe^{II}/Fe^{III}$ and subsequently boiling to close the pores. After incorporation in the display device, during a write/erase operation the electrochemical reaction at the counter electrode is oxidation/reduction of iron species, with the result that the counter electrode potential will vary during these operations by only a few millivolts.

Industrial Applicability

Electrochromic devices made in accordance with this invention are useful in most applications that display devices can be used. For example, they may be used in watches and hand calculators.

Another embodiment of the counter electrode uses a polymeric film which is coated on the counter electrode using any suitable technique such as photolithography. The electrolyte is heptyl viologen dibromide so the preferred conductor material is platinum. Quaternization of the pyridine residues in poly-(2-vinylpyridine) produces a quaternary ammonium residue which is coated on the counter electrode. Quaternary ammonium bromide salts form charge-transfer complexes with elemental bromine. The polymer layer is charged with elemental bromine. This has the advantageous effect of enhancing the conductivity of the polymer film as well as charging the counter electrode to within a predetermined potential range.

In a third embodiment, the counter electrode is treated as symmetrical with the display electrode so that erasure of the display electrode is accompanied by writing at the counter electrode and vice-versa. The effect is as if the erase operation transferred colored species from the display electrode to the counter electrode. During an initial write and erase, the counter electrode is charged through the intervention of a suitable agent. The colored species is not visible because of the opacity of the counter electrode, and, subsequently, voltage erase can be successfully used. By way of non-restrictive example, we consider an implementation of this embodiment using heptyl viologen dications as the active display material. As agent a small amount of sodium bisulphite, for example, 0.01 M, is used. During a first write cycle, heptyl viologen cation radicals are deposited on the display electrodes, while at the counter electrode irreversible oxidations of bisulphite ions occurs. During the subsequent erase cycle, the reoxidation of the display electrode deposit is accompanied by deposition of heptyl viologen cation radicals on the counter electrode which thus becomes charged. During subsequent write cycles, reduction of heptyl vilogen occurs at the display electrodes and oxidation at the counter electrode. The opposite reactions occur during subsequent erase cycles.

The product of oxidation of the bisulphite ion has not been identified but is thought to be dithionate ($S_2O_6^{--}$), see M. Pourbaix, Atlas of Electrochemical Equilibria in Aqueous Solutions (Pergamon Press).

An additional advantage of the use of sodium bisulphite is its property of oxygen scavenging, since it reacts with free oxygen to form sodium sulphate. Free oxygen, which may diffuse into the display from the atmosphere, is deleterious to operation of an electrochromic display using heptyl viologen.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by Letters Patent is:

1. An electrochromic display device comprising:
   a hollow panel enclosing an electrolyte and having a first transparent face and a second face,
   a counter electrode located on the inner surface of the said transparent face, said counter electrode containing material that undergoes a reversible redox reaction in said electrolyte at a known potential, said counter electrode being opaque and having the shape of a pattern of lines, and
   a plurality of display electrodes on the inner surface of said second face.

2. A device as claimed in claim 1, wherein the pattern of lines is reticulate.

3. A device as claimed in claim 2, wherein the pattern of lines is a rectangular grid.

4. A device as claimed in claim 2, wherein each mesh of the reticulate pattern overlies a plurality of display electrodes.

5. A device as claimed in claim 1, wherein the pattern of lines is in grid-iron form.

6. A device as claimed in claim 1, wherein the lines of the pattern are not straight.

7. An electrochromic display device comprising:
   a hollow panel enclosing an electrolyte containing heptyl viologen dications and having a first transparent face and a second face,
   a counter electrode located on the inner surface of the said transparent face, said counter electrode containing a material that undergoes a reversible redox reaction in said electrolyte at a known potential, said counter electrode being opaque and conductive and having the shape of a pattern of lines, and
   a plurality of display electrodes on the inner surface of said second face.

8. A device as claimed in claim 7, wherein said material is trapped within the pores of an nodized $Al_2O_3$ layer of said counter electrode.

9. A device as claimed in claim 7, wherein said material is a redox couple.

10. A device as claimed in claim 7, wherein said material is the redox couple $Fe^{III}/Fe^{II}$.

11. A device as claimed in claim 7, wherein said counter electrode has a layer of chargeable polymeric charge transfer material coated thereon.

12. A device as claimed in claim 11, wherein said layer of charge transfer material is poly-2-vinylpyridine.

13. A device as claimed in claim 11, wherein said electrolyte includes heptyl viologen dibromide, and said layer of charge transfer material contains bromine.

* * * * *